(12) United States Patent
Strobel et al.

(10) Patent No.: US 6,454,201 B1
(45) Date of Patent: Sep. 24, 2002

(54) FRICTION CLUTCH AND BELT RETRACTOR WITH FRICTION CLUTCH

(75) Inventors: Ralf Strobel, Schwäbisch Gmünd (DE); Hermann-Karl Weller, Alfdorf (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/614,098

(22) Filed: Jul. 11, 2000

(30) Foreign Application Priority Data

Jul. 12, 1999 (DE) ................................ 299 12 154 U

(51) Int. Cl.$^7$ .............................................. B60R 22/28
(52) U.S. Cl. ...................... 242/379.1; 464/81; 464/82
(58) Field of Search .................. 242/379.1; 280/806; 297/478; 464/81, 82, 41, 42, 45

(56) References Cited

U.S. PATENT DOCUMENTS

| | | | |
|---|---|---|---|
| 1,165,772 A | 12/1915 | Garrand | |
| 2,779,175 A | 1/1957 | Le Hew | |
| 3,363,478 A * | 1/1968 | Lanning | ................ 464/82 |
| 3,666,198 A * | 5/1972 | Neumann | ............... 242/379.1 |
| 3,881,667 A * | 5/1975 | Tandetzke | ............... 242/379.1 |
| 3,905,562 A * | 9/1975 | Kell | ............... 242/379.1 |
| 4,043,437 A | 8/1977 | Taylor | |
| 4,190,138 A | 2/1980 | Bendall | |
| 4,222,246 A | 9/1980 | Rongley | |
| 4,878,880 A | 11/1989 | Williams | |
| 5,607,023 A * | 3/1997 | Palm | ............... 464/45 |
| 5,707,291 A | 1/1998 | Fuller | |
| 5,810,668 A * | 9/1998 | Graham et al. | ............... 464/81 |

FOREIGN PATENT DOCUMENTS

| DE | 187002 | 5/1906 |
|---|---|---|
| DE | 332137 | 3/1920 |
| DE | 809877 | 8/1951 |
| DE | 916370 | 8/1954 |
| DE | 473330 | 7/1969 |
| DE | 6932536 | 8/1969 |
| DE | 97279 | 4/1973 |
| DE | 434451 | 6/1995 |
| DE | 29510741 | 2/1996 |
| DE | 29816280 | 3/1999 |
| EP | 0461326 | 12/1991 |
| GB | 2175358 | 11/1986 |
| JP | 07101310 | 4/1995 |
| WO | 9727088 | 7/1997 |

\* cited by examiner

*Primary Examiner*—John M. Jillions
(74) *Attorney, Agent, or Firm*—Tarolli, Sundheim, Covell, Tummino & Szabo L.L.P.

(57) ABSTRACT

A belt retractor comprises a belt spool rotatably mounted in a frame, a locking mechanism for the belt spool with at least one locking disc connected to the belt spool, and a torque limiting member arranged in a force flow path between the belt spool and the locking disc. The torque limiting member is constructed as a friction clutch comprising two clutch faces lying opposite each other and a friction member arranged between the clutch faces. The friction member is constructed as a flat spring part having shaped sections. The shaped sections lie at least partially against at least one of the clutch faces.

6 Claims, 4 Drawing Sheets

FRICTION CLUTCH AND BELT RETRACTOR WITH FRICTION CLUTCH

TECHNICAL FIELD

The invention relates to a friction clutch and to a belt retractor incorporating such a friction clutch.

BACKGROUND OF THE INVENTION

Known friction clutches have as friction member a metal disc which is arranged between two clutch plates and is provided on both sides with a clutch lining. The clutch lining ensures on the one hand a high frictional force to the clutch plates and on the other hand is designed such that it can deal with the stresses of pressure and temperature during operation. The friction member is hence always composed of several parts of different material. In order to ensure the necessary contact pressure and hence a sufficient frictional force, the clutch plates and the friction member are pressed together by means of a separate spring.

In known belt retractors, a belt force limitation is achieved in that in the force flow path between the belt spool and the locking disc a torsion rod is arranged, which is twisted on exceeding a predetermined torque and in so doing is plastically deformed. A controlled torque limitation is only possible here once and in one direction.

The object of the invention is to provide a friction clutch and a belt retractor with torque limitation, which operate in two directions in a force-limiting manner and at the same time are constructed simply and are able to be manufactured at a favorable cost.

BRIEF SUMMARY OF THE INVENTION

This is achieved in a friction clutch which comprises two clutch faces lying opposite each other and a friction member arranged between the clutch faces. The friction member is constructed as a flat spring part having shaped sections, the shaped sections lying at least partially against at least one of the clutch faces. Such a friction clutch is able to be produced particularly simply and at a favorable cost, because the necessary contact pressure between friction member and clutch faces is applied by the friction member itself, because this is constructed as a spring part. A separate pressure spring can therefore be dispensed with. The friction member can be produced for example in a simple manner as a sheet metal stamped member at low cost. The torque which is able to be transferred through the friction clutch is codetermined substantially by the elastic force of the spring part.

In a further embodiment of the invention, the shaped sections have a cross-section in the form of a circular arc as seen in a direction parallel to the clutch faces. Good elastic characteristics are achieved with a cross-section in the form of a circular arc. In tangential direction to the cross-section of the shaped sections in the form of a circular arc, the transferable friction force is, moreover, independent of direction.

Advantageously, the spring part is constructed as a corrugated band. Such a corrugated band is constructed in a simple manner and is suitable for arrangement between concentric clutch faces. Both the shaped sections, lying partially against the first clutch face and also the shaped sections of the spring part lying partially against the second clutch face then have a cross-section in the form of a circular arc. These measures also allow the friction member to consist of one single part.

It is likewise advantageous if the spring part is constructed as a cylinder with elastic shaped sections. Here, also, the friction member consists of a single part and is able to be mounted in a particularly simple manner between two concentric clutch faces, because the cylinder has a certain inherent stability and can thus be easily pressed in between the clutch faces.

In a further advantageous embodiment, the spring part is constructed as a plate with elastic shaped sections. Such an embodiment permits the arrangement between two clutch plates. The spring part likewise consists of a single part and can be produced in a particularly simple manner as a sheet metal stamped part.

According to the invention, there is also provided a belt retractor comprising a belt spool rotatably mounted in a frame, a locking mechanism for the belt spool with at least one locking disc connected to the belt spool, and a torque limiting member arranged in a force flow path between the belt spool and the locking disc, in which the torque limiting member is constructed as a friction clutch. Such a belt retractor acts in a force-limiting manner in two directions, because the friction clutch limits the torque in two directions. Hence, peak values of the belt force can be avoided both with the locking of the belt spool in a vehicle-sensitive or belt webbing-sensitive manner and also during operation of a belt tensioner engaging on the belt spool via the friction clutch. In contrast to conventional belt retractors with torsion rods as torque limiting member, the belt retractor according to the invention can also be re-used after a torque limitation has been occurred.

Advantageously, a first clutch plate is provided which is connected non-rotatably with the belt spool and presents a first clutch face and a second clutch plate is provided which is connected non-rotatably with the locking disc and presents a second clutch face, a plate being arranged between the first and second clutch faces which has elastic shaped sections. These measures make possible a space-saving construction of the belt retractor, because the friction clutch is constructed so as to be flat and extends in radial direction. The friction clutch can be arranged for example outside the frame of the belt retractor on the belt spool axle.

An advantageous embodiment is also produced in that a first cylinder face is provided which is connected non-rotatably with the belt spool and presents the first clutch face and a second cylinder face is provided which is connected non-rotatably with the locking disc and presents the second clutch face, a cylinder being arranged between the first and second clutch faces which has elastic shaped sections. In such a belt retractor, the spring part is stressed uniformly, because the same relative speed occurs everywhere between the concentric clutch faces.

In a further embodiment of the invention, provision is finally made that the first clutch face is formed by a side face of an extension of a belt spool axle non-rotatably connected to the belt spool, and the second clutch face is formed by an inner face of a hollow cylinder non-rotatably connected to the locking disc. To realize the friction clutch, such a belt retractor requires only a small effort as regards construction, because it is merely necessary to alter already existing parts, namely the belt spool axle and the locking disc, and also the spring part. The belt spool axle merely has to be provided with an extension, extending for example outside the frame, and a hollow cylinder, concentric to the belt spool axle, must be attached to the locking disc, The spring part is then pushed onto the extension of the belt spool axle and into the hollow cylinder of the locking disc.

DETAILED DESCRIPTION OF THE PREFERRED EMBODIMENTS

Figure 1:
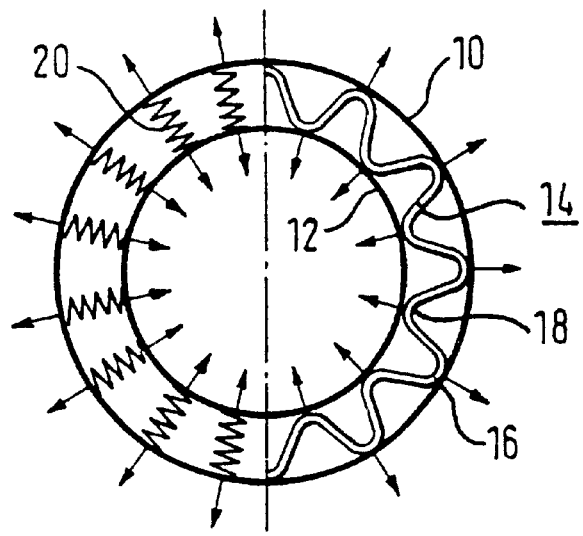
FIG. 1 shows a diagrammatic illustration to explain the functioning principle of the friction clutch according to the invention.

The diagrammatic illustration of FIG. 1 shows two clutch faces 10 and 12 arranged concentrically to each other. On the right-hand side of FIG. 1, a band-shaped spring part 14 is arranged between these clutch faces 10 and 12. The band-shaped spring part 14 has shaped sections which form first sections 16 lying partially against the first clutch face 10, and second sections 18 lying partially against the second clutch face 12. Both the first sections 16 and also the second sections 18 have a cross-section in the form of a circular arc as seen in a direction parallel to the clutch faces 10 and 12. Through the shaped sections, in the form of a circular arc, of the spring part 14, the latter assumes the form of a corrugated band. The spring part 14 is pressed in between the clutch faces 10 and 12, so that through the spring action of the spring part 14 the first sections 16 exert a force onto the clutch face 10 and the second sections 18 exert a force onto the clutch face 12. The forces exerted onto the clutch faces 10 and 12 are symbolized in FIG. 1 by arrows. The spring action of the spring part 14 between the clutch faces 10 and 12 is symbolized in the left-hand part of FIG. 1 by helical springs 20 which are arranged between the clutch faces 10 and 12 and exert a force onto them. Each corrugation of the spring part 14 behaves like a spring 20, the force of which in the elastic range is proportional to the spring constant and to the deflection of the spring. The friction force which is able to be transferred between the spring part 14 and the clutch faces 10 or 12 results from the radial force indicated by arrows in FIG. 1, which is perpendicular to the clutch faces 10 or 12, and the friction coefficient between the spring part 14 and the clutch face 10 or 12. The torque which is able to be transferred as a whole through the friction clutch then follows from the radial dimensions of the clutch. On exceeding a predetermined torque between the spring part 14 and the clutch faces 10 or 12, a transition takes place from static friction to sliding friction. Thereby, the transferable torque decreases and the force in a belt webbing connected for example to the clutch face 10 is limited. The friction clutch illustrated in FIG. 1 can limit the transferred torque here in two directions, clockwise and anticlockwise.

Figure 2:
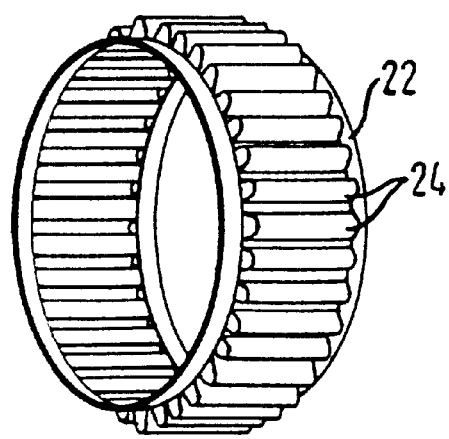
FIG. 2 shows a perspective illustration of an embodiment of the spring part for the friction clutch according to the invention.

In FIG. 2, a spring part 22 is illustrated, which is constructed as a cylinder with elastic shaped sections 24. The shaped sections 24 have an elongated shape, and several shaped sections 24 are arranged around the periphery of the cylinder 22 with their respective long side adjoining each other. The cylinder 22 has a certain inherent stability, so that it can easily be pressed in between two concentric clutch faces.

Figure 3:
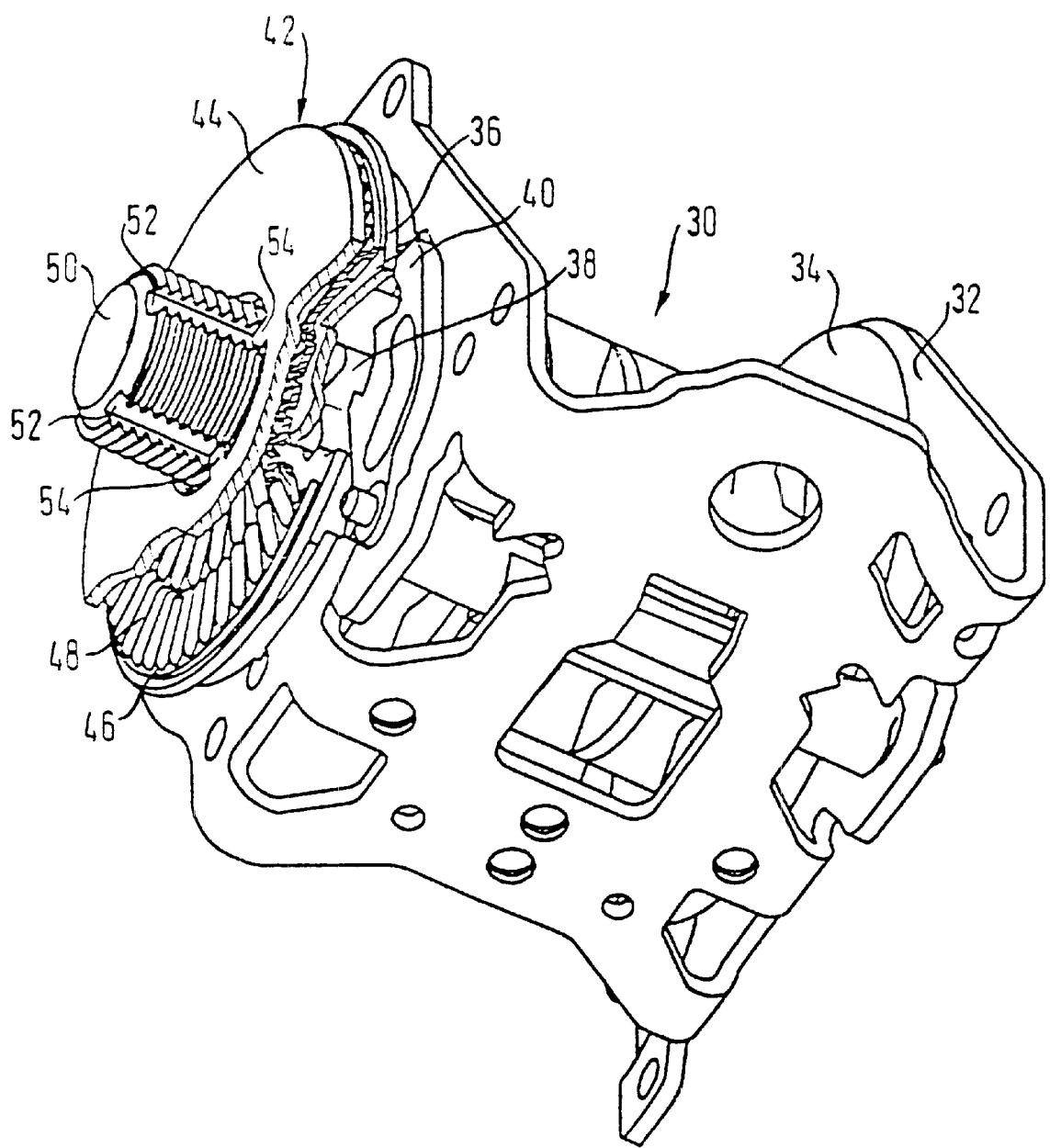
FIG. 3 shows a perspective view, partially in section, of a first embodiment of the belt retractor according to the invention.

FIG. 3 shows a first embodiment of a belt retractor 30 according to the invention. The belt retractor 30 has a frame 32, a belt spool 34 mounted in the frame 32 and a locking mechanism for the belt spool 34. The locking mechanism consists of a locking disc 36 with a locking toothing 38. To lock the belt spool 34 with respect to the frame 32, a locking pawl 40 can be caused to engage the locking toothing 38 by a conventional driving mechanism, which is not illustrated, acting in a vehicle-sensitive and belt webbing sensitive manner. To limit the belt force, the belt retractor 30 is provided with a friction clutch 42 which is arranged in the force flow path between the belt spool 34 and the locking disc 36. The friction clutch 42 consists of the locking disc 36, a clutch plate 44 and a spring plate 46 arranged between the locking disc 36 and the clutch plate 44. The spring plate 46 is constructed as a sheet metal stamped part and has elastic shaped sections 48, which are arranged annularly in two rows around the mid-point of the circular plate 46. A belt spool axle 50 is firmly connected to the belt spool 34 and extends through the frame 32, the locking toothing 38, the locking disc 36, the spring plate 46 and the clutch plate 44. Whereas the locking disc 36 is rotatably mounted on the belt spool axle 50, the clutch plate is fastened non-rotatably, but so as to be displaceable longitudinally, on the belt spool axle 50. For this, the belt spool axle 50 has several longitudinal grooves 52, into which noses 54 of the clutch plate 44 engage.

Figure 4:
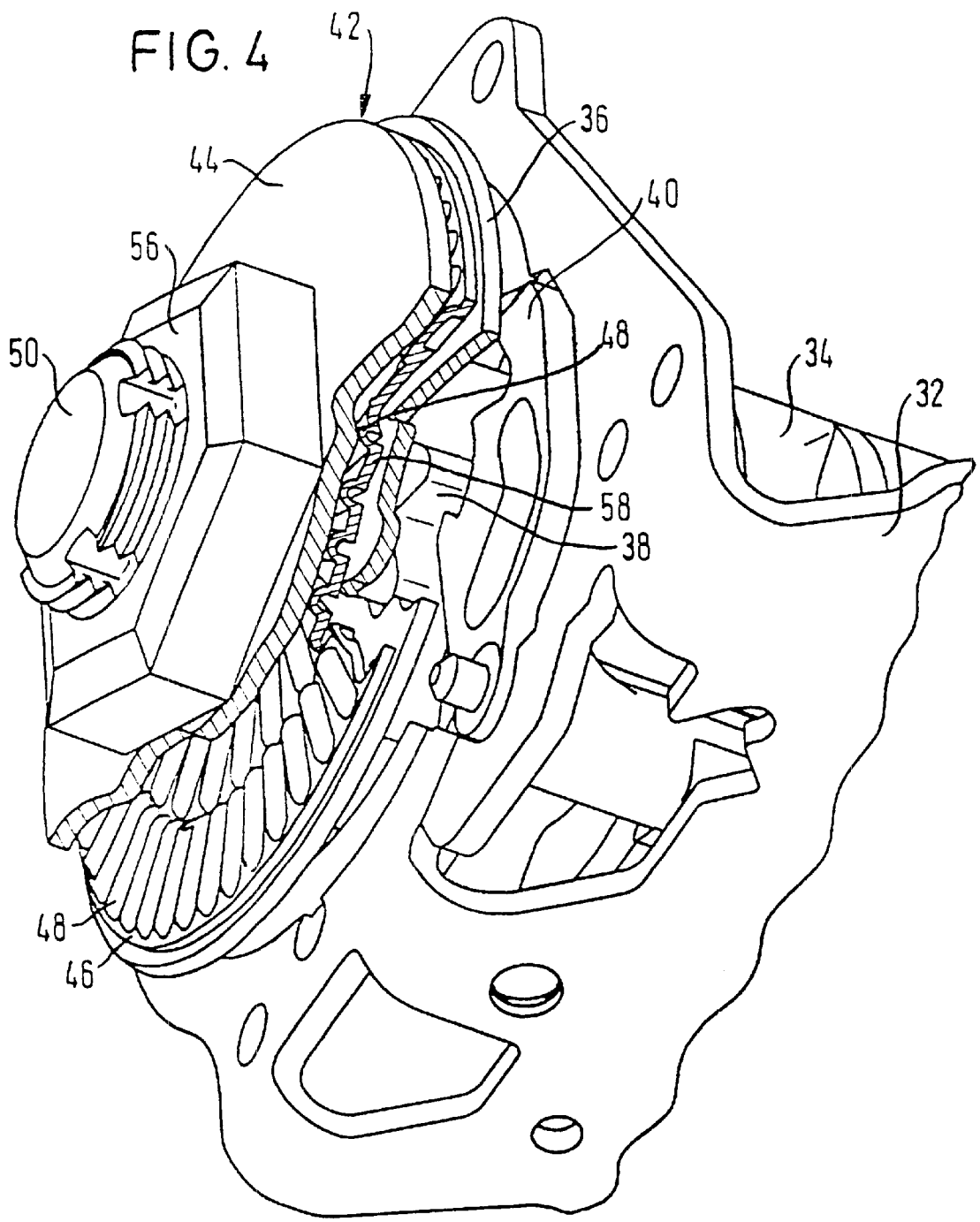
FIG. 4 shows a perspective detail view, partially in section, of the belt retractor of FIG. 3.

As can be seen in FIG. 4, the clutch plate 44 is prestressed by a nut 56, screwed onto the belt spool axle 50, against the spring plate 46 and the locking disc 36. Depending on how great the torque is to be which is transferable by the friction clutch 42, the nut 56 is tightened to a greater or lesser extent.

In FIG. 4 it can also be seen that the shaped sections 48 of the spring plate 46 have a cross-section in the form of a circular arc as seen in a direction parallel to the clutch faces. The shaped sections 48 thereby have a good spring action, and the friction clutch 42 can act in two directions in a torque-limiting manner. The individual shaped sections 48 of the spring plate 46 are connected to each other by straight sections 58. Whereas the shaped sections 48 form first sections of the spring plate 46 which lie against the first clutch face formed by the face of the clutch plate 44 facing the frame 32, the straight sections 58 form second sections which lie against the second clutch face, which is formed by the face of the locking disc 36 facing away from the frame 32.

In a vehicle impact, the locking pawl 40 is caused to engage in a vehicle-sensitive or belt webbing-sensitive manner into the locking toothing 38 of the locking disc 36, so that the belt spool 34 is locked with respect to the frame 32 and no more belt webbing can be unwound from the belt spool 34. When a vehicle occupant moves forward, the force acting in the belt webbing thereby increases. Owing to the force acting in the belt webbing, the friction clutch 42 must transfer a torque. If this torque which is to be transferred by the friction clutch 42 exceeds a predetermined value, the maximum frictional force transferable between the first sections, formed by the shaped sections 48, and the first clutch face or the maximum frictional force transferable between the second sections formed by the straight sections 58 and the second clutch face, is also exceeded, so that the clutch disc 44 can rotate relative to the locking disc 36. Thereby, also, belt webbing can be unwound again from the belt spool 34, so that the belt force in the belt webbing is also reduced. If the maximum torque transferable by the friction clutch 42 is fallen below again, static friction occurs again between the spring plate 46 and the locking disc 36 and the clutch disc 44, respectively, so that no more relative rotation of the clutch disc 44 with respect to the locking disc 36 is possible.

Figure 5:
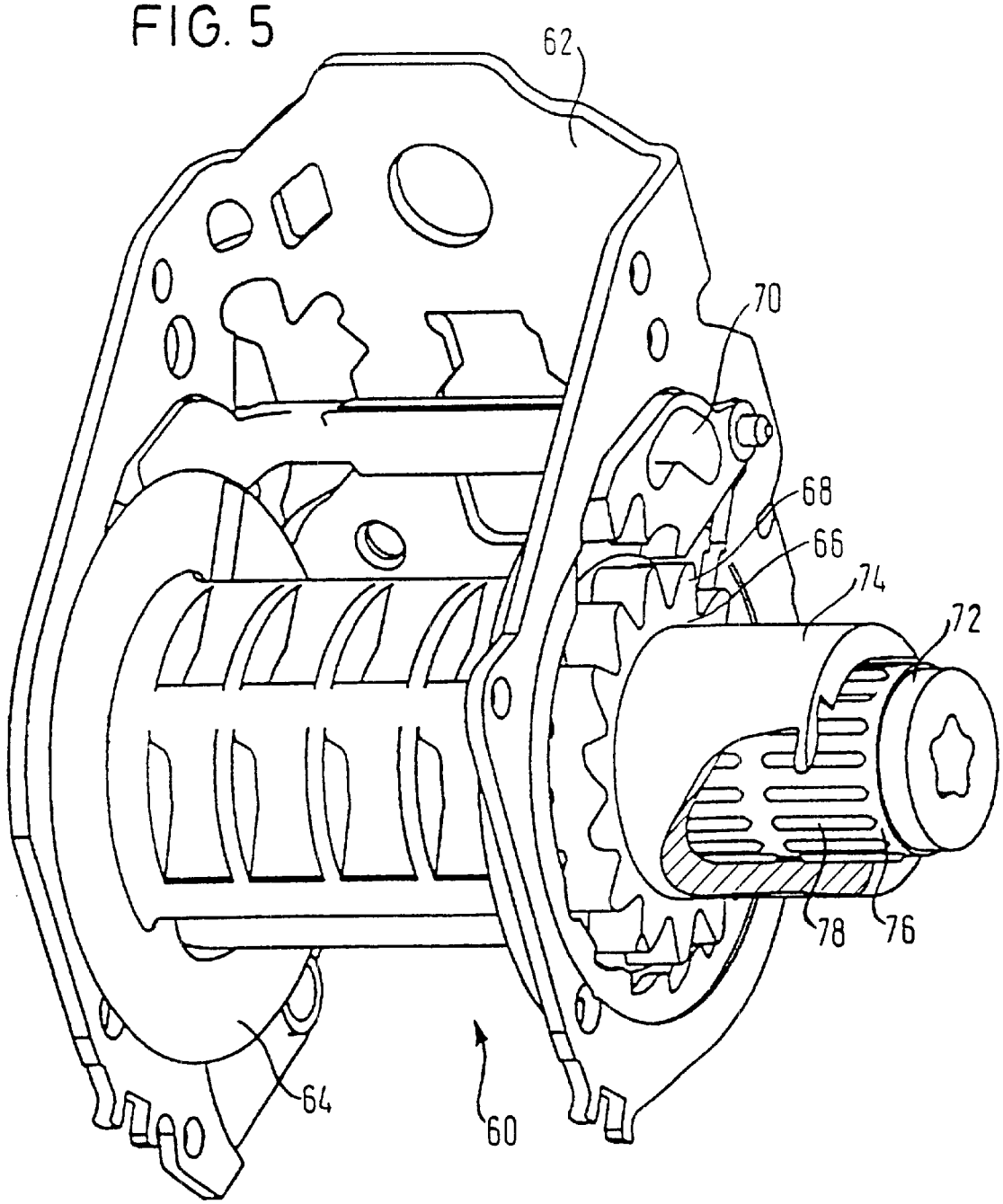
FIG. 5 shows a perspective view, partially in section, of a second embodiment of the belt retractor according to the invention.

A second embodiment of a belt retractor 60 according to the invention is illustrated in FIG. 5. In the same way as the belt retractor illustrated in FIGS. 3 and 4, the belt retractor 60 has a frame 62, a belt spool 64, a locking disc 66 with a locking toothing 68 and a locking pawl 70 which is able to be brought into engagement with the locking toothing 68. The belt spool 64 has an axle which is firmly connected to the belt spool 64 and which has an extension 72 extending beyond the frame 62. The locking disc 66 is fixedly provided with a hollow cylinder 74, in which the extension 72 of the belt spool axle extends. A spring part consisting of a cylinder 76 with elastic shaped sections 78 is pressed in between the extension 72 of the belt spool axle and the hollow cylinder 74 of the locking disc 66. The friction clutch for torque limiting, provided in the belt retractor 60, is thereby formed by a side face of the extension 72, the cylinder 76 with elastic shaped sections 78 and the inner face of the hollow cylinder 74. With the arrangement of the friction clutch shown in FIG. 5, the relative speed between the clutch faces is identical over the entire clutch faces, so that the spring part consisting of the cylinder 76 with the shaped sections 78 is stressed uniformly throughout. The additional structural expenditure which is necessary to realize the friction clutch in the belt retractor 60 is small here, because the belt spool axle only has to be provided with the extension 72 and the locking disc 66 only has to be provided with the hollow cylinder 74. Apart from the cylinder 76 as friction member, therefore no additional parts are necessary compared with a conventional belt retractor.

What is claimed is:

1. A belt retractor comprising a belt spool rotatably mounted in a frame, a locking mechanism for said belt spool with at least one locking disc connected to said belt spool, and a torque limiting member arranged in a force flow path between said belt spool and said locking disc, said torque limiting member being constructed as a friction clutch comprising first and second clutch faces lying opposite each other and a friction member arranged between said first and second clutch faces, said friction member being constructed as a flat spring part having shaped sections, said shaped sections lying at least partially against at least one of said first and second clutch faces, wherein a first clutch plate is provided which is connected non-rotatably with said belt spool and includes said first clutch face and wherein a second clutch plate is provided which is connected non-rotatably with said locking disc and includes said second clutch face and a plate being arranged between said first and second clutch faces which has said elastic shaped sections, each of said shaped sections having a cross-section in the form of a circular arc.

2. The belt retractor according to claim 1 wherein said spring plate is a unitary annular shaped structure defined by a plurality of continuously extending elastic shaped sections.

3. A belt retractor comprising a belt spool rotatably mounted in a frame, a locking mechanism for said belt spool with at least one locking disc connected to said belt spool, and a torque limiting member arranged in a force flow path between said belt spool and said locking disc, said torque limiting member being constructed as a friction clutch comprising first and second clutch faces lying opposite each other and a friction member arranged between said first and second clutch faces, said friction member being constructed as a flat spring part having shaped sections, said shaped sections lying at least partially against at least one of said first and second clutch faces, wherein a first cylinder face is provided which is connected non-rotatably with said belt spool and includes said first clutch face and a second cylinder face is provided which is connected non-rotatably with said locking disc and includes said second clutch face, and a cylinder being arranged between said first and second clutch faces which has said elastic shaped sections.

4. The belt retractor according to claim 3 wherein said friction member exerts a radial force between said first and second clutch faces.

5. The belt retractor according to claim 3 wherein said spring plate is a unitary annular shaped structure defined by a plurality of continuously extending elastic shaped sections.

6. The belt retractor according to claim 3 wherein said first clutch face is formed by a side face of an extension of a belt spool axle and said second clutch face is formed by an inner face of a hollow cylinder connected to said locking disc.

* * * * *